UNITED STATES PATENT OFFICE.

G. FRANK EVANS, OF PORTLAND, MAINE.

CASE-HARDENING AND CEMENTATION COMPOUND.

SPECIFICATION forming part of Letters Patent No. 376,186, dated January 10, 1888.

Application filed July 24, 1886. Serial No. 209,003. (No specimens.)

*To all whom it may concern:*

Be it known that I, G. FRANK EVANS, a citizen of the United States, residing at Portland, in the county of Cumberland, State of Maine, have invented certain new and useful Improvements in Case-Hardening and Cementation Compounds, of which the following is a specification.

My invention relates to the manufacture of a material from lobster-shells, or from shells of other crustaceans.

The object of my invention is to utilize what has heretofore been a waste material, and at the same time produce a material of great value in many of the useful arts.

My invention consists in a case-hardening and cementation compound consisting of the comminuted charred shells of crustaceans, as more fully hereinafter specified.

In carrying out my invention I take lobster-shells, or the shells of crustaceans, and heat them in cast-iron cylinders, in any well-known manner, to produce a carbon combined with alkaline phosphates and nitrogenous matter. The material thus produced will be found superior for the intended purpose, as the shells consist of carbonate of lime, which, with the carbon of the animal matter after incineration, peculiarly adapts the material to its work. Iron or other metal subjected to the heat of this shell product will assume a surface of diamond-like hardness of a uniform depth, regardless of the difference or variation in the thickness of the metal.

It will be noticed that I produce a product from a material which has heretofore been wasted, and am enabled to produce a material of superior quality much cheaper than that heretofore made, as there is no extra trouble required to prepare the shells for the carbonizing process, as is the case in the manufacture of bone or animal charcoal, while it possesses all the requisite qualities of both wood and animal charcoal combined. The material thus produced is readily distinguishable from all others by reason of its thin flaky appearance and the peculiar configuration of the shells from which it is made.

I am fully aware that fish-bones have been incinerated to form a compound for hardening metals; but my invention differs from these, inasmuch as the bones contain but little lime, while the shells of fish are largely composed of it.

Having thus described my invention, what I claim, and desire to secure by Letters Patent, is—

The herein-described case hardening and cementation compound, consisting of the comminuted charred shells of crustaceans, substantially as specified.

In testimony whereof I affix my signature in presence of witnesses.

G. FRANK EVANS.

Witnesses:
 HARRY R. VIRGIN,
 FRANK W. ROBINSON,
 THOMAS J. FROTHINGHAM.